(12) United States Patent
Rother et al.

(10) Patent No.: US 7,430,339 B2
(45) Date of Patent: Sep. 30, 2008

(54) BORDER MATTING BY DYNAMIC PROGRAMMING

(75) Inventors: Carsten Curt Eckard Rother, Cambridge (GB); Vladimir Kolmogorov, Gough Way (GB); Andrew Blake, Stapleford (GB)

(73) Assignee: Microsoft Corporation, Redmond, WA (US)

( * ) Notice: Subject to any disclaimer, the term of this patent is extended or adjusted under 35 U.S.C. 154(b) by 510 days.

(21) Appl. No.: 10/914,485

(22) Filed: Aug. 9, 2004

(65) Prior Publication Data

US 2006/0039611 A1    Feb. 23, 2006

(51) Int. Cl.
G06K 9/36 (2006.01)
(52) U.S. Cl. .................. 382/284; 382/173; 382/164
(58) Field of Classification Search ................ 382/284, 382/173, 164, 243; 345/629–641
See application file for complete search history.

(56) References Cited

U.S. PATENT DOCUMENTS

| | | | |
|---|---|---|---|
| 5,617,487 A | | 4/1997 | Yoneyama et al. |
| 6,088,486 A | * | 7/2000 | Yamaguchi et al. ......... 382/243 |
| 6,337,925 B1 | * | 1/2002 | Cohen et al. ................ 382/199 |
| 6,377,269 B1 | * | 4/2002 | Kay et al. ................... 345/589 |
| 6,741,755 B1 | * | 5/2004 | Blake et al. ................. 382/284 |
| 6,744,923 B1 | * | 6/2004 | Zabih et al. ................. 382/226 |
| 6,839,463 B1 | * | 1/2005 | Blake et al. ................. 382/173 |
| 6,906,729 B1 | * | 6/2005 | Sanz-Pastor et al. ........ 345/611 |
| 2002/0102029 A1 | * | 8/2002 | Sekiguchi et al. ........... 382/243 |

FOREIGN PATENT DOCUMENTS

| | | |
|---|---|---|
| EP | 0 959 625 A | 11/1999 |
| WO | WO 01/26050 A | 4/2001 |

OTHER PUBLICATIONS

"Toboggan-based intelligent scissors with a four-parameter edge model" Mortensen, E.N.; Barrett, W.A.; Computer Vision and Pattern Recognition, 1999. IEEE Computer Society Conference on. vol. 2, Jun. 23-25, 1999.*
"Stereo matching with transparency and matting" Szeliski, R.; Golland, P.; Computer Vision, 1998. Sixth International Conference on Jan. 4-7, 1998 pp. 517-524.*
"Bayesian video matting using learnt image priors" Apostoloff, N.; Fitzgibbon, A.;Computer Vision and Pattern Recognition, 2004. CVPR 2004. Proceedings of the 2004 IEEE Computer Society Conference on vol. 1, Jun. 27-Jul. 2, 2004 pp. I-407-I-414 vol. 1.*
Alpha channel estimation in high resolution and image sequences Hillman, P.; Hannah, J.; Renshaw, D.; Computer Vision and Pattern Recognition, 2001. CVPR 2001. Proceedings of the 2001 IEEE Computer Society Conference on vol. 1, 2001 pp. I-1063-I-1068 vol. 1.*

(Continued)

*Primary Examiner*—Jingge Wu
*Assistant Examiner*—Sean Motsinger (57) ABSTRACT

Techniques are disclosed to provide more efficient and improved border matting for extracted foreground images, e.g., without requiring excessive user interaction. Border matting techniques described herein generate relatively continuous transparency (or alpha values) along the boundary of the extracted object (e.g., limiting color bleeding and/or artifacts).

28 Claims, 9 Drawing Sheets
(5 of 9 Drawing Sheet(s) Filed in Color)

OTHER PUBLICATIONS

A Bayesian approach to digital matting Yung-Yu Chuang; Curless, B.; Salesin, D.H.; Szeliski, R.; Computer Vision and Pattern Recognition, 2001. CVPR 2001. Proceedings of the 2001 IEEE Computer Society Conference on vol. 2, 2001 pp. II-264-II-271 vol. 2.*

Interactive graph cuts for optimal boundary & region segmentation of objects in N-D images Boykov, Y.Y.; Jolly, M.-P.; Computer Vision, 2001. Proceedings. Eighth IEEE International Conference on vol. 1, Jul. 7-14, 2001 pp. 105-112 vol. 1.*

"Grab Cut Interactive foreground extraction Using iterated Graph Cuts" Rother et al, Microsoft Reaserch, Cambrige UK, AMC Transactions on Graphcis, Aug. 2004.*

U.S. Appl. No. 11/173,882, filed Jul. 1, 2005, Jian Sun, Heung-Yeung Shum, Yin Li.

European Patent Office, "European Search Report", for European Patent Application No. 05 01 5023.4, Examiner Herter, J., Aug. 10, 2005.

Rother C, et al "GrabCut"—Interactive Foreground Extraction using Iterated Graph Cuts, ACM Transactions on Graphics ACM USA, Aug. 2004, pp. 309-314, vol. 23, No. 3.

Smith A., et al "Blue Screen Matting", Computer Graphics Proceedings, Aug. 4, 1996, pp. 259-268, New Orleans, US.

Gerald Himmelein "Isoliersoftware Bildverarbeitung: Corel Knockout 1.5 Fuer Mac OS Und Windows", CT Magazin Fuer Computer Technik, p. 68, Aug. 2000, Hannover, DE.

* cited by examiner

FIG. 1

BORDER MATTING
OVERVIEW

BORDER MATTING

BORDER MATTING BY DYNAMIC PROGRAMMING

TECHNICAL FIELD

The present invention generally relates to digital image processing, and more particularly to border matting.

BACKGROUND

As computer technology improves, computer systems with more powerful processor(s) and larger storage unit(s) become more commonplace. With this growth in processing power and storage size, implementation of digital imaging technology also becomes more practical. For example, higher resolution images may be processed in a shorter time period.

Digital images of a scene may be directly acquired (e.g., by a digital camera) or conventionally taken by a film-based camera and later digitized (e.g., by a scanner). Once an image is in digital format, it may be digitally manipulated. Often, a first step in digital image processing involves the selection of certain portions of a scene. Digital techniques (such as filtering, copying, and pasting) may then be applied to the selected portion(s).

Currently, a number of techniques are used to extract a foreground from a scene with varying degrees of user involvement. The extracted foreground can, however, include artifacts and/or color bleeding from the background. According, the current foreground extraction techniques generally fail to provide a reasonably smooth border for the extracted foreground, without significant user interaction.

As such, more efficient and improved smooth extraction of a portion of a scene is desired, e.g., without generating artifacts and/or color bleeding from the background.

SUMMARY

Techniques are disclosed to provide more efficient and improved border matting for extracted foreground images, e.g., without requiring excessive user interaction. Border matting techniques described herein generate relatively continuous transparency (or alpha values) along the boundary of the extracted object (e.g., limiting color bleeding and/or artifacts).

In an implementation, a method includes receiving a segmented image having a foreground region and background region. The method determines a contour along a boundary between the two regions. An unknown region is determined, extending from the contour (i.e., the region where alpha map needs to be computed). Alternatively, the contour may be determined by starting from a trimap, where the contour is determined in the provided unknown region. An energy function is defined which corresponds to one or more parameters of an alpha map of pixels in the unknown region. The energy function is minimized to estimate a center parameter and a width parameter for the alpha map. And, the alpha map is computed which corresponds to the estimated center and width parameters.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program.

The computer program product encodes a computer program for a computer process executing on a computer system. The computer process receives a segmented image having a foreground region and a background region. The process determines a contour along a boundary between the two regions and an unknown region extending from the contour (i.e., the region where alpha map needs to be computed). Alternatively, the contour may be determined by starting from a trimap, where the contour is determined in the provided unknown region. An energy function is defined which corresponds to one or more parameters of an alpha map of pixels in the new unknown region. The energy function is minimized to estimate a center parameter and a width parameter for the alpha map. And, the alpha map is computed which corresponds to the estimated center and width parameters.

Other implementations are also described and recited herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

The following disclosure generally describes techniques for improving digital image processing. More specifically, techniques are disclosed for improved border matting which may be applied to an extracted foreground portion of a scene, without excessive user interaction. Moreover, it is envisioned that the techniques discussed herein may be applied to any desired portion of an image (e.g., an object, a foreground, and the like).

Border matting techniques described herein are envisioned to limit artifacts (see, e.g., artifacts of FIGS. 2A-B) and/or to enable recovery of the foreground color, e.g., limiting color bleeding from the background. In an implementation, border matting can be applied to simultaneously estimate the alpha-matte around an object boundary and the colors of foreground pixels to limit negative affects of blurring and/or mixed pixels along smooth object boundaries.

Overview

Figure 1:
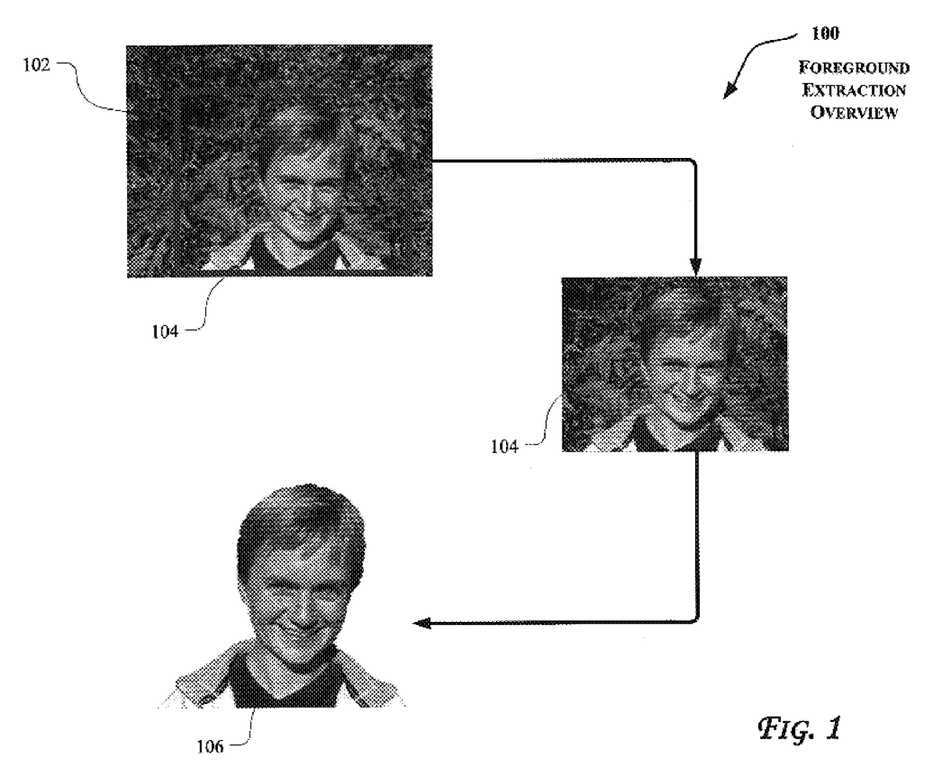
FIG. 1 illustrates an exemplary flow diagram for extracting a portion of an image.

FIG. 1 illustrates an exemplary flow diagram 100 for extracting a portion of an image. As illustrated in FIG. 1, an image 102 includes a desired object within a region 104. To extract the object within the region 104, a user may select the desired region (104) by drawing a rectangle (or another shape, such as a lasso, polygon, triangle, trapezoid, ellipse, circle, and the like) to enclose the object. Accordingly, the user selects the desired portion by defining two points (i.e., a start point and an end point) on the image 102 in an implementation. Also, the user does not need to necessarily trace the portion of interest with particularity.

Figure 5:
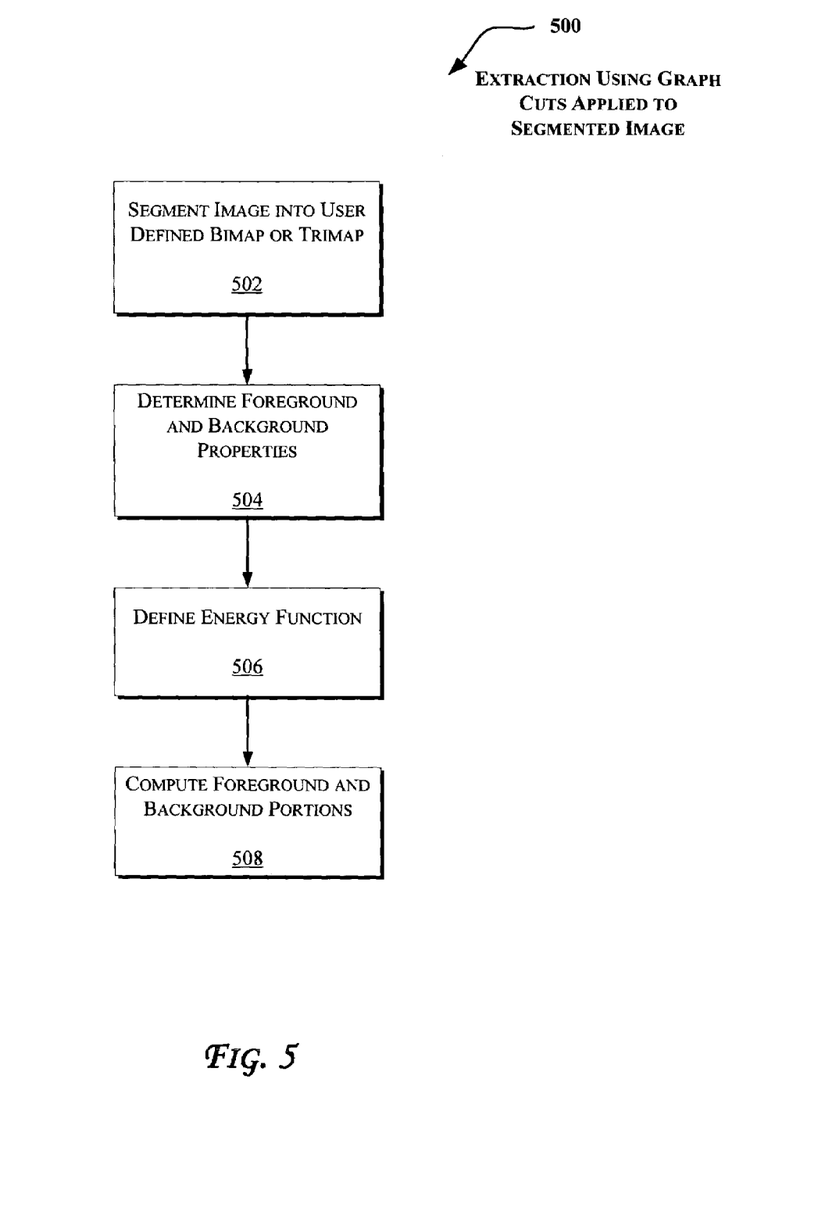
FIG. 5 illustrates an exemplary method for extracting an image portion using graph cuts applied to a user defined bimap or trimap.
Figure 6:
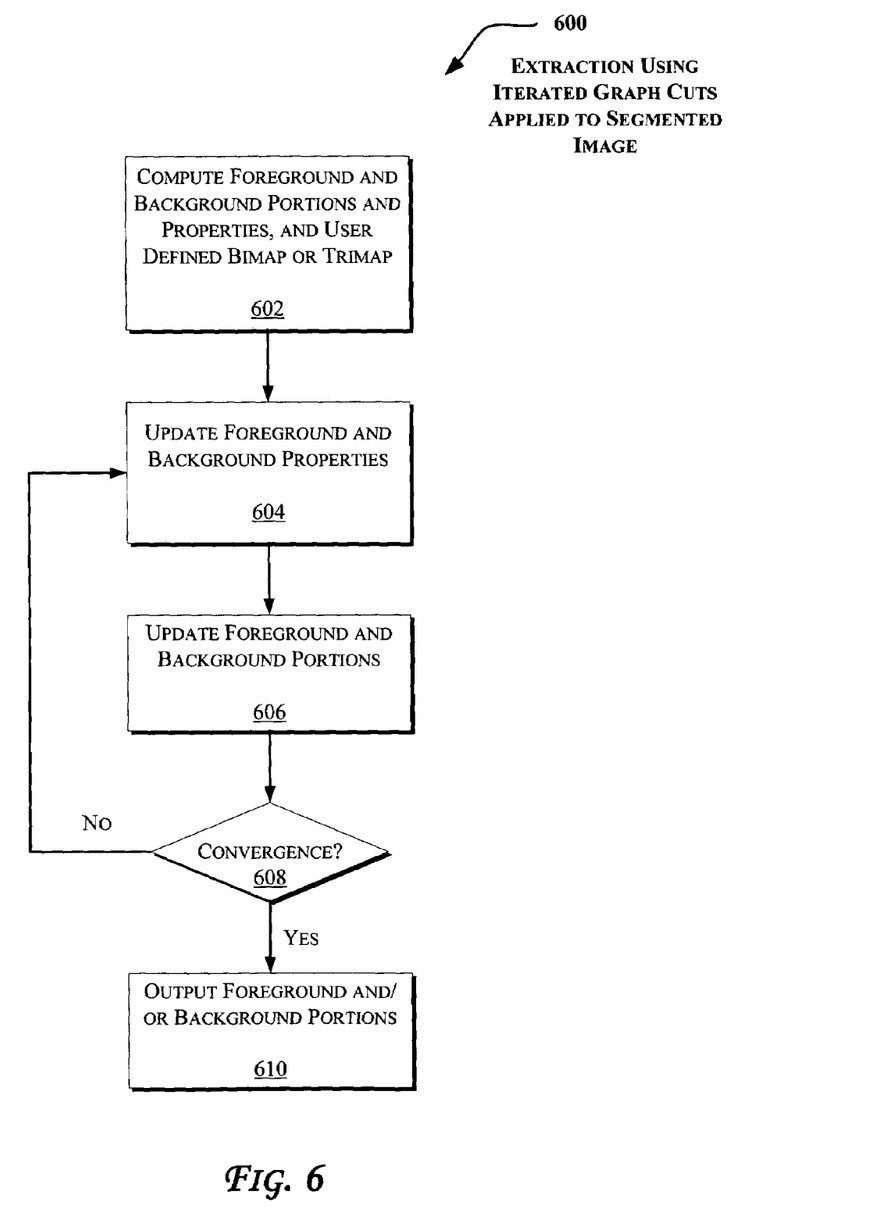
FIG. 6 illustrates and exemplary method for extracting an image portion using iterated graph cuts.

Once the region 104 is selected, the object or portion of interest within the region 104 can be extracted (106) by the techniques discussed herein (e.g., with reference to FIGS. 5 and 6). In one implementation, the extracted portion 106 may be pasted into another image or otherwise processed digitally (e.g., by applying filters, color changes, and the like).

Overview of Border Matting Results

Figure 2A:
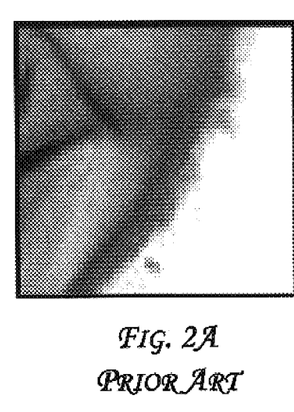
FIGS. 2A-C illustrate various results after application of border matting to a section of the extracted portion 106 discussed with reference to FIG. 1.
Figure 2B:
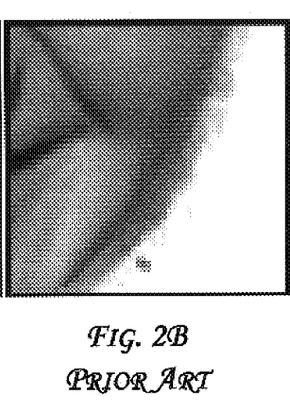
Figure 2C:
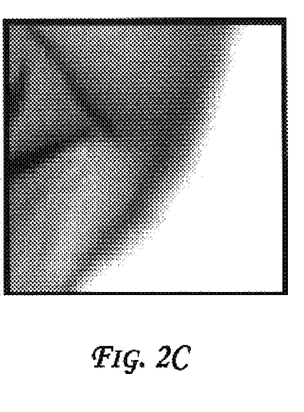

FIGS. 2A-C illustrate various results after application of border matting to a section of the extracted portion 106 discussed with reference to FIG. 1. FIG. 2A illustrates the result of border matting in accordance with Knockout 2 prior art technique. FIG. 2B illustrates the result of border matting in accordance with Bayes Matte prior art technique. FIG. 2C illustrates the result of border matting in accordance with the techniques discussed herein (e.g., with reference to FIGS. 3 and 4). As illustrated in FIG. 2C, the techniques discussed herein provide a cleaner matte than either of the techniques of FIGS. 2A-B.

Border Matting Techniques

Figure 3:
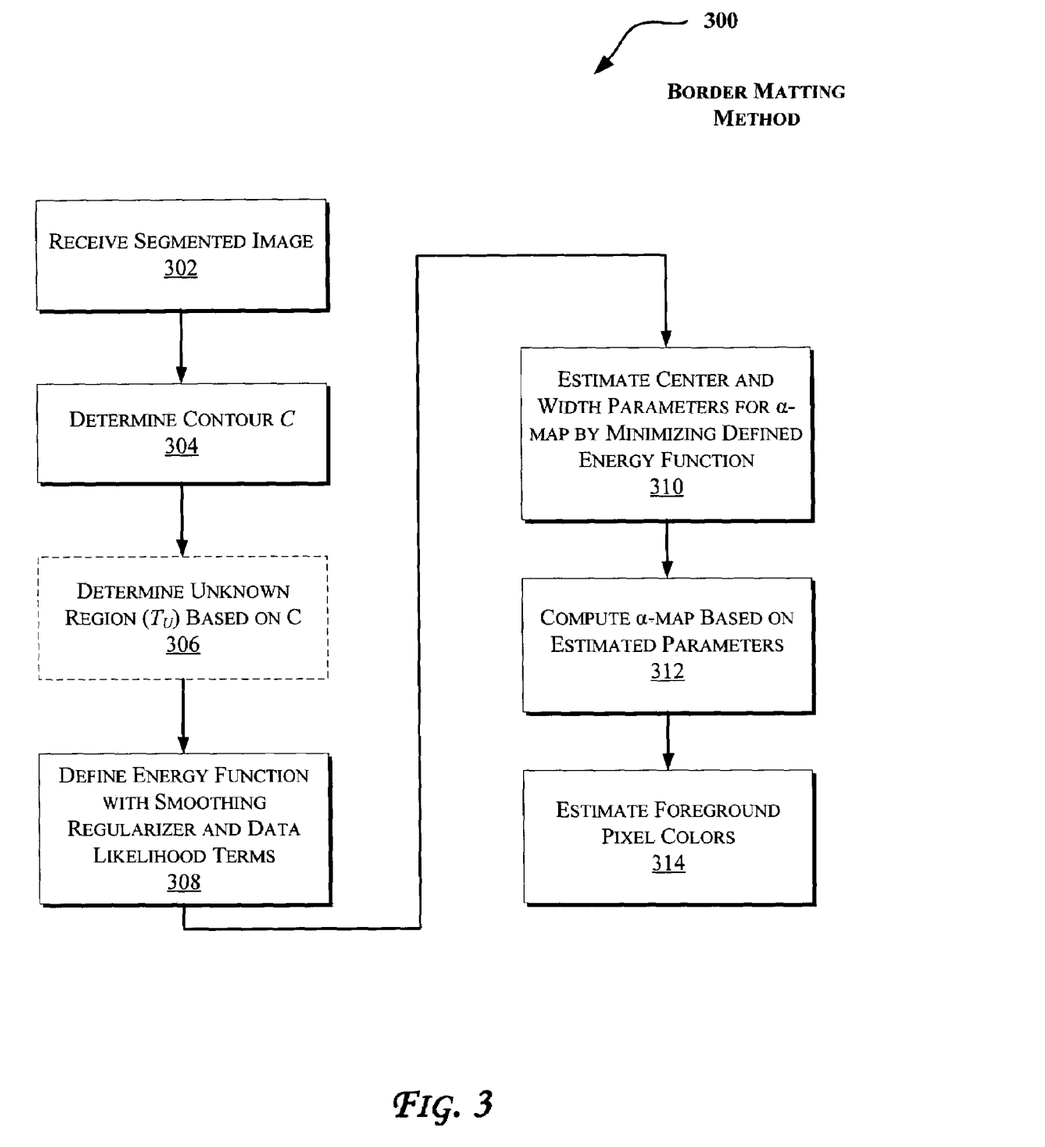
FIG. 3 illustrates an exemplary border matting method for generating continuous transparency (or alpha values) along an object boundary.

FIG. 3 illustrates an exemplary border matting method 300 for generating continuous transparency (or alpha values) along an object boundary. Border matting may also be applied to simultaneously estimate the alpha-matte around an object boundary and the colors of foreground pixels to limit negative affects of blurring and/or mixed pixels along smooth object boundaries. Accordingly, an alpha map may be estimated without generating artifacts (see, e.g., artifacts of FIGS. 2A-B) and/or to recover the foreground color, free of color bleeding from the background.

Figure 4A:
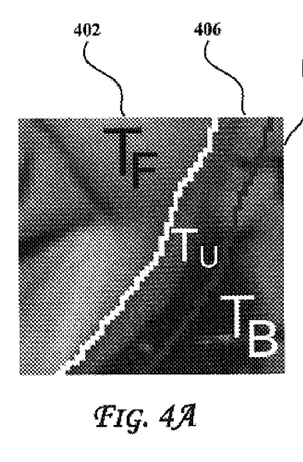
FIG. 4A illustrates an original image segmented into a trimap.
Figure 4B:
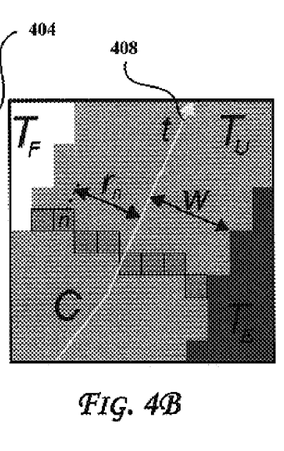
FIG. 4B illustrates notation for contour parameterization and distance map associated with a contour C.

Referring to FIGS. 3, 4A, and 4B, once a scene is segmented into a bimap or a trimap (302), a contour C 408 is determined (304) by fitting a poly-line (or other curve-fitting techniques) to the segmentation boundary of the segmented scene. A bimap includes two regions, namely, a foreground 402 ($T_F$) and background 404 ($T_B$). A trimap includes an additional region referred to as an unknown region 406 ($T_U$). In case of a trimap, the contour C 408 is in the unknown region 406 ($T_U$). The bimap segmentation will be further discussed with reference to FIGS. 5-8, and may be obtained by applying an iterative hard segmentation (e.g., pixel by pixel).

For a bimap, an unknown region 406 ($T_U$) is then computed (optional stage 306) as the set of pixels in a ribbon of width ±w pixels on either side of the contour C. In an implementation, w may be set to six pixels wide. Thus, this procedure defines a trimap consisting of a foreground 402 ($T_F$), background 404 ($T_B$) and an unknown region 406 ($T_U$).

Alternatively, as mentioned with respect to the stage 302, the method 300 can receive this trimap as an input. Then contour C can be computed using a number of different techniques, for example by using skeletonization.

To define an α-map or α-profile for each pixel in $T_U$, i.e., $\alpha_n$, $n \in T_U$, a relatively simple model depending on small number of parameters may be assumed for the shape of the α-map within $T_U$. To find the optimal parameters of the model, an energy function may be defined. This energy function may include regularization (e.g., to enhance the quality of the estimated α-map). A dynamic programming (DP) algorithm may be used for minimizing the energy function, i.e., computing model parameters and hence α throughout $T_U$.

Figure 4C:
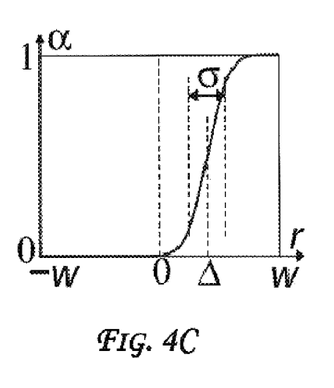
FIG. 4C illustrates a soft step-function for $\alpha$-profile g, with center $\Delta$ and width $\sigma$, corresponding to the image of FIG. 4A.

More particularly, let $t=1,\ldots,T$ be a parameterization of contour C, which is periodic with period T, as curve C is closed in an implementation. An index t(n) is assigned to each pixel $n \in T_U$, as illustrated in FIG. 4B. The α-map is taken to be a soft step-function g (FIG. 4C): $\alpha_n = g(r_n; \Delta_{t(n)}, \sigma_{t(n)})$, where $r_n$ is the distance from pixel n to contour C (see, e.g., FIG. 4B). Parameters $\Delta, \sigma$ determine the center and width respectively of the transition from 0 to 1 in the α-map (see, e.g., FIG. 4C). It is assumed that all pixels with the same index t share values of the parameters $\Delta_t, \sigma_t$. These parameter values may be estimated by minimizing the following energy function, e.g., using DP over t:

$$E = \sum_{n \in T_U} \tilde{D}_n(\alpha_n) + \sum_{t=1}^{T} \tilde{V}(\Delta_t, \sigma_t, \Delta_{t+1}, \sigma_{t+1}),$$

where $V$ is a smoothing regularizer as follows:

$$V(\Delta, \sigma, \Delta', \sigma') = \lambda_1 (\Delta - \Delta')^2 + \lambda_2 (\sigma - \sigma')^2$$

The role of the smoothing regularizer $V$ is to encourage α-values to vary smoothly as t increases, along the curve C (e.g., taking $\lambda_1 = 50$ and $\lambda_2 = 10^3$). For the DP computation, values of $\Delta_t$ may be discretised into 30 levels and $\sigma_t$ into 10 levels. A general smoothness term $V$ would require a quadratic time in the number of profiles to move from t to t+1, however, the identified regularizer allows a linear time algorithm using distance transforms. If the contour C is closed, minimization cannot be done exactly using single-pass DP and we approximate by using two passes of DP, assuming that the first pass gives the optimal profile for t=T/2.

The data term is defined as:

$$\tilde{D}_n(\alpha_n) = -\log N\left(z_n; \mu_{t(n)}(\alpha_n), \sum_{t(n)}(\alpha_n)\right)$$

In the above equation, $$N\left(z_n; \mu_{t(n)}(\alpha_n), \sum_{t(n)}(\alpha_n)\right)$$

denotes a Gaussian probability density for z with mean μ and covariance Σ. Mean and covariance for the above equation are defined for matting as follows:

$$\mu_t(\alpha) = (1-\alpha)\mu_t(0) + \alpha\mu_t(1)$$

$$\sum_t(\alpha) = (1-\alpha)^2 \sum_t(0) + \alpha^2 \sum_t(1)$$

The Gaussian parameters $\mu_t(\alpha)$, $\Sigma_t(\alpha)$, $\alpha=0,1$ for foreground and background are estimated as the sample mean and covariance from each of the regions $F_t$ and $B_t$ defined as $F_t=S_t\cap T_F$ and $B_t=S_t\cap T_B$, where $S_t$ is a square region of size L×L pixels centered on the segmentation boundary C at t (e.g., L=41). Accordingly, this approach provides a data likelihood estimation for a pixel in the unknown region given alpha value.

Referring back to FIG. 3 and as detailed above, an energy function (E) is defined with a smoothing regularizer term (V) and a data likelihood term ($D_n$) (308). By minimizing the defined energy function, center and width parameters ($\Delta$,$\sigma$, respectively) for the $\alpha$-map are estimated (310). The estimated parameters are utilized to compute the $\alpha$-map (312).

Foreground Estimation

In addition to computing the $\alpha$-map (312), border matting results may be improved by estimating foreground pixel colors (314) to limit or eliminate colors bleeding in from the background of the source image. Such bleeding can occur with some prior art techniques (such as Bayes matting, see, e.g., FIG. 2B) because of the probabilistic algorithm used which aims to strip the background component from mixed pixels but cannot do so precisely. The residue of the stripping process can show up as color bleeding. In one implementation, the bleeding can be avoided by borrowing pixels from the foreground $T_F$. First, the Bayes matte algorithm may be applied to obtain an estimate of foreground color $\hat{f}_n$ on a pixel $n\in T_U$. Then, from the neighborhood $F_{t(n)}$ (as defined above), the pixel color that is most similar to $\hat{f}_n$ is borrowed to form the foreground color $f_n$. The combined results of border matting, using both regularized alpha computation and foreground pixel borrowing, are illustrated in FIG. 2C.

Foreground Extraction Using Iterated Graph Cuts

FIG. 5 illustrates an exemplary method 500 for extracting an image portion using graph cuts applied to a user defined bimap or trimap. In method 500, the user first segments an image into a bimap or a trimap (502). In one implementation, utilizing a bimap (instead of a trimap) is envisioned to assist a user by requiring less user interaction. In a bimap segmentation, a user may define a background portion and an unknown portion ($T_B$, $T_U$ or B and U, respectively, as discussed further herein). In trimap segmentation, a user may initialize a trimap of the image at hand. The trimap includes regions $T_B$, $T_U$, and $T_F$, where $T_B$ and $T_F$ are the background and foreground regions, respectively, and $T_U$ is the remaining region (unknown region). For simplicity, $T_B$, $T_U$, and $T_F$ may be referred to herein as B, U, and F regions, respectively. The user may initialize the bimap by supplying $T_B$ and $T_U$ (as discussed with reference to FIG. 1). Then, $T_U$ and $T_F$ initially have the same value (e.g., the interior of the rectangle (104) in FIG. 1). The image data may be modeled as discussed below.

Specifying the Energy for Graph Cuts

The image is considered to include pixels $Z_n$, each in color space. The color space may be a red-green-blue (RGB) color space. Distributions such as probability distributions, like a Gaussian mixture models (GMMs), may be used to implement the color distribution in the color space. For example, each GMM (one for the background and one for the foreground) is taken to be a full-covariance Gaussian mixture with K components (e.g., K=5). Also, histograms may be utilized (e.g., for monochrome implementations). Instead of distributions, discriminative methods may also be used to define the likelihood of a pixel belonging to a certain color distribution. Other image features or properties may also be used as discussed further below.

In order to deal with the GMM tractably, in the optimization framework, an additional vector $k=\{k_1,\ldots,k_n,\ldots,K_N\}$ is utilized, with $k_n\in\{1,\ldots K\}$, assigning, to each pixel, a unique GMM component (one component either from the background or the foreground model) according as opacity values (which express the hard segmentation of the image) $\alpha_n=0$ or 1.

Therefore, GMM components may be assigned to pixels for each n in $T_U$:

$$k_n := \arg\min_{k_n} D_n(\alpha_n, k_n, \theta, z_n).$$

Referring to FIG. 5, properties of the foreground and background distributions are determined (504). These properties may include information regarding the portions at hand, foreground and/or background, which are defined by the user in 502. It is envisioned that many different feature such as color, blur, and the like may be used as properties. In one implementation, GMM parameters are learned from data z as will be further discussed below.

The Gibbs energy for segmentation may be defined (506) as:

$$E(\underline{\alpha},k,\underline{\theta},z)=U(\underline{\alpha},k,\underline{\theta},z)+V(\underline{\alpha},z),$$

where the parameter $\underline{\theta}$ describes the image foreground and background distributions (as learned, for example, in the stage 504), V is a smoothness term using a contrast term computed by Euclidean distance in color space, U evaluates the fit of opacity distribution $\underline{\alpha}$ to the data z, given the parameter $\underline{\theta}$ and taking account of the color GMM models, where:

$$U(\underline{\alpha}, k, \underline{\theta}, z) = \sum_n D(\alpha_n, k_n, \underline{\theta}, z_n),$$

where $D(\alpha_n,k_n,\underline{\theta},z_n)=-\log p(z_n|\alpha_n,k_n,\underline{\theta})-\log\pi(\alpha_n,k_n)$, and $p(\square)$ is a Gaussian probability distribution, and $\pi(\square)$ are mixture weighting coefficients, so that (up to a constant):

$$D(\alpha_n, k_n, \underline{\theta}, z_n) = -\log \pi(\alpha_n, k_n) + \frac{1}{2}\log\det\sum(\alpha_n, k_n) + \frac{1}{2}[z_n-\mu(\alpha_n,k_n)]^T\sum(\alpha_n,k_n)^{-1}[z_n-\mu(\alpha_n,k_n)].$$

Therefore, the parameters of the model are:

$$\underline{\theta}=\{\pi(\alpha,k),\mu(\alpha,k),\Sigma(\alpha,k),\alpha=0,1,k=1\ldots K\},$$

(hence, the weight $\pi$, means $\mu$, and covariances $\Sigma$ of 2K Gaussian components for the background and foreground distributions). The smoothness term V term is computed as follows (where the contrast term is computed using Euclidean distance in the color space):

$$V(\underline{\alpha}, z) = \gamma \sum_{(m,n) \in C} [\alpha_n \ne \alpha_m] \exp - \beta \|z_m - z_n\|^2,$$

where C is the set of pairs of neighboring pixels. When the constant β=0, the smoothness term is simply the well-known Ising prior, encouraging smoothness everywhere, to a degree determined by the constant γ. In an implementation, β may be greater than 0 to relax the tendency to smoothness in regions of high contrast. The constant β may be chosen as:

$$\frac{1}{\beta} = 2\langle (z_m - z_n)^2 \rangle,$$

where (□) denotes expectation over an image sample. In an implementation, such a choice of β ensures that the exponential term in V switches appropriately between high and low contrast.

In light of the energy model discussed above, the segmentation can be estimated as a global minimum:

$$\hat{\alpha} = \arg\min_{\underline{\alpha}} E(\underline{\alpha}, \underline{\theta}).$$

Accordingly, the minimization may be done using a standard minimum cut algorithm. In one implementation, the one-shot minimum cut estimation algorithm is replaced by an iterative technique that alternates between estimation and parameter learning (as will be further discussed in the next section). The method 500 continues by computing the foreground and background portions (508), which is the result, $\underline{\alpha}$, of the energy minimization. All pixels in the trimap region $T_B$ are assigned to background and all pixels in $T_F$ to foreground. Pixels in $T_U$ are assigned to either foreground or background, depending on the result $\underline{\alpha}$.

Segmentation by Iterative Energy Minimization

FIG. 6 illustrates and exemplary method 600 for extracting an image portion using iterated graph cuts. The inputs to the method 600 are a background portion and a foreground portion and properties (602), such as discussed with reference to FIG. 5, and also the bimap or trimap defined by the user. The foreground and background portions are used to update the foreground and background properties (604) (e.g., based on the portions computed by the stage 508 of FIG. 5). This updating process is further discussed below. As will be further discussed below, the foreground and background properties may also be updated based on updated foreground and background portions (rather than the initially computed background and foreground portions).

The foreground and background portions are updated (606), based on the updated foreground and background properties (604). For example, the updating may be done by running a minimum cut algorithm (e.g., a one-shot version or an iterative version as discussed with reference to FIG. 5). This process uses the initial user defined bimap or trimap, in order to determine the unknown region U where new foreground or background labels are inferred. In case of user interactions (see below), the new bimap or trimap, which was edited by the user, is used.

The method 600 repeats the stages 604 through 606 until it is determined that convergence has been achieved (608). In an implementation, a computer program (such as those discussed with reference to FIG. 10) determines whether convergence has been achieved (e.g., by setting a threshold). Once it is determined that convergence has been achieved, the foreground and/or background portion(s) are output (610). Accordingly, the method 600 provides a desired portion of an image by iteratively updating the foreground and background properties and the foreground and background portions in an implementation.

Figure 8:
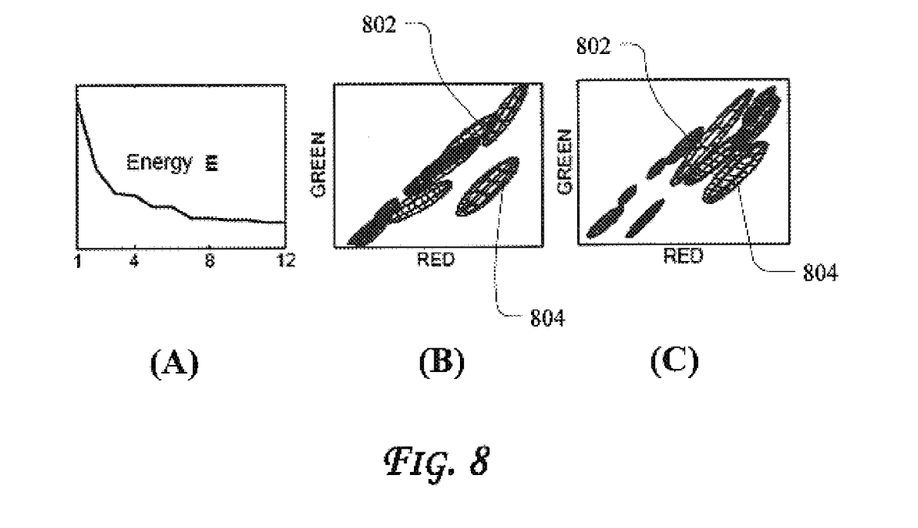
FIGS. 8A-C illustrate exemplary monotonical decrease in energy E and the corresponding background and foreground separation.

In an implementation, the structure of the method 600 guarantees proper convergence properties (i.e. to a local minimum). This is because each of the stages 604 to 606 of iterative minimization can be shown to be a minimization of the total energy E with respect to the three sets of variables k, $\underline{\theta}, \underline{\alpha}$ in turn. Hence, E decreases monotonically, and this is illustrated in practice in FIG. 8 as will be discussed further below.

It is envisioned that the iterative minimization may reduce the amount of user interaction needed to complete a segmentation task, relative to the one-shot graph cut approach. This is apparent in two ways. First the degree of user editing required, after initialization and optimization, is reduced. Second, the initial interaction can be simpler, for example by allowing incomplete labeling by the user, as described below.

In summary, the iterative energy minimization allows automatic refinement of the opacities $\underline{\alpha}$, i.e. foreground and background portions, as newly labeled pixels from the $T_U$ region of the initial trimap are used to refine the color GMM parameters $\underline{\theta}$ discussed above.

Modeling and Updating the Foreground and Background Properties

Figure 7:
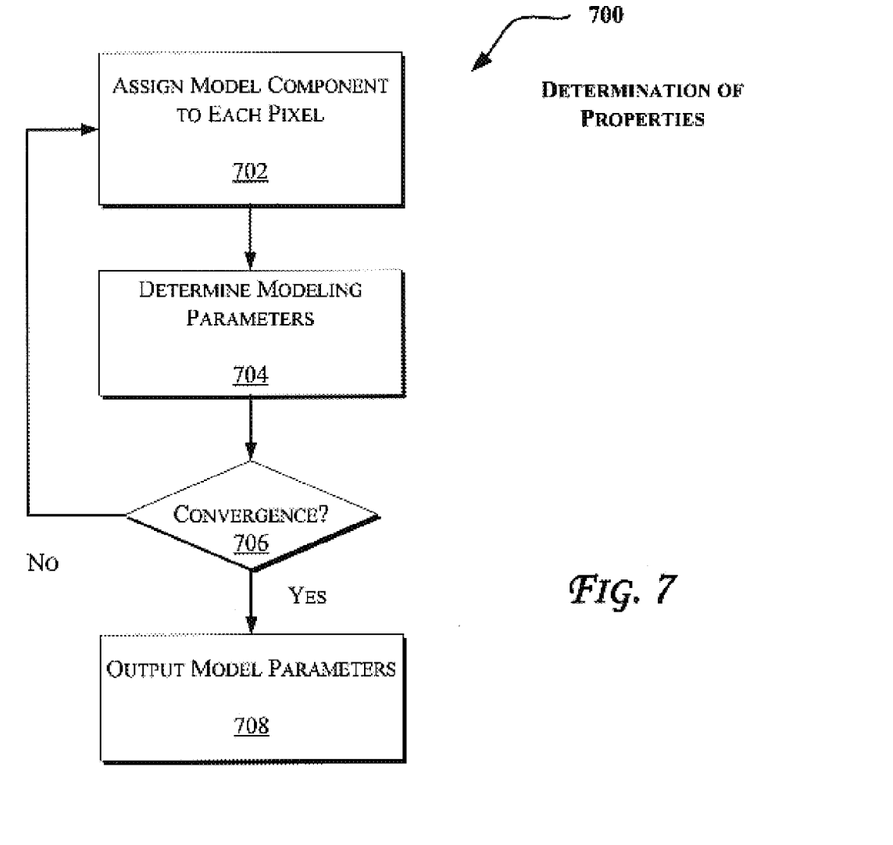
FIG. 7 illustrates an exemplary method for determination of foreground and background properties.

FIG. 7 illustrates an exemplary method 700 for determination of foreground and background properties (e.g., as discussed with reference to the stage 504 of FIG. 5). After initialization of the bimap or trimap (such as discussed with reference to FIG. 5), a model component $k_n \in \{1, \ldots, K\}$ is assigned to each pixel n (702). The stage 702 may be done by simple enumeration of the $k_n$ values for each pixel n (namely, $$k_n := \arg\min_{k_n} D_n(\alpha_n, k_n, \theta, z_n)).$$

A set of modeling parameters (e.g., Gaussian) are determined from the data z (704):

$$\underline{\theta} := \arg\min_{\underline{\theta}} U(\underline{\alpha}, k, \underline{\theta}, z).$$

The stage 704 may be implemented as a set of Gaussian parameter estimation procedures, as follows (this is also known as Expectation Maximization (EM)). For a given GMM component k in, for example, the foreground model, the subset of pixels $F(k) = \{z_n : k_n = k \text{ and } \alpha_n = 1\}$ is defined. The mean $\mu(\alpha, k)$ and covariance $\Sigma(\alpha, k)$ are estimated in standard fashion as the sample mean and covariance of pixel values in F(k) and weights are estimated as:

$$\pi(\alpha, k) = |F(k)| / \Sigma |F(k)|,$$

where |S| denotes the size of a set S.

After computing the model parameters, the pixels can be reassigned to model components $k_n \in \{1, \ldots, K\}$. In one implementation, the stages 702 and 704 are repeated until convergence (706) is achieved. Accordingly, this method is guaranteed to converge to a local minimum in an implementation.

The output of the method 700 (708) is the model parameters (i.e., the properties of either foreground or background). This iterative algorithm is performed separately to obtain the properties for foreground and background in one implementation.

Convergence of Iterative Minimization

FIG. 8A illustrates exemplary monotonical decrease in energy E and the corresponding background and foreground separation. The GMM in RGB color space (side-view showing R, G) at initialization (FIG. 8B) and after convergence (FIG. 8C). K equal to 5 mixture components was used for both background (e.g., 802) and foreground (e.g., 804). Initially (FIG. 8B), both GMMs overlap considerably, but are better separated after convergence (FIG. 8C), as the foreground/background labeling has become more accurate.

User Interaction and Incomplete Trimaps

The iterative minimization method 700 allows increased versatility of user interaction. In particular, incomplete labeling becomes feasible where, in place of the full trimap T, the user needs only specify, the background region $T_B$, leaving $T_F=0$, i.e. a bimap, (as discussed with reference to stage 502 of FIG. 2, for example). No hard foreground labeling is required.

In an implementation, iterative minimization (FIG. 7) deals with this incompleteness by allowing provisional labels on some pixels which can subsequently be retracted as discussed later.

Further User Editing

The initial, incomplete user-labeling is envisioned to be often sufficient to allow the entire segmentation to be completed automatically. Alternatively, further user editing may be performed, e.g., by brushing pixels, constraining them either to be firm foreground or firm background. After the brushing, the one-shot segmentation, as in FIG. 5 may be applied. In addition, an optional "refine" operation may be applied which also updates the color models, following user edits. This means that iterated graph cuts are applied as discussed with respect to FIG. 6. This propagates the effect of edit operations in a way which may be beneficial in some implementations. Furthermore, it is envisioned that segmentation may be changed with existing tools such as intelligent scissors (a.k.a., live wire or magnetic lasso).

In some implementations, user editing may be applied to improve the object extraction. For example, user editing may be applied: (1) where regions of low contrast at the transition from foreground to background are present; (2) in camouflage situations in which the true foreground and background distributions overlap partially in color space; or (3) background material inside the selected user rectangle happens not to be adequately represented in the background region.

Figure 9:
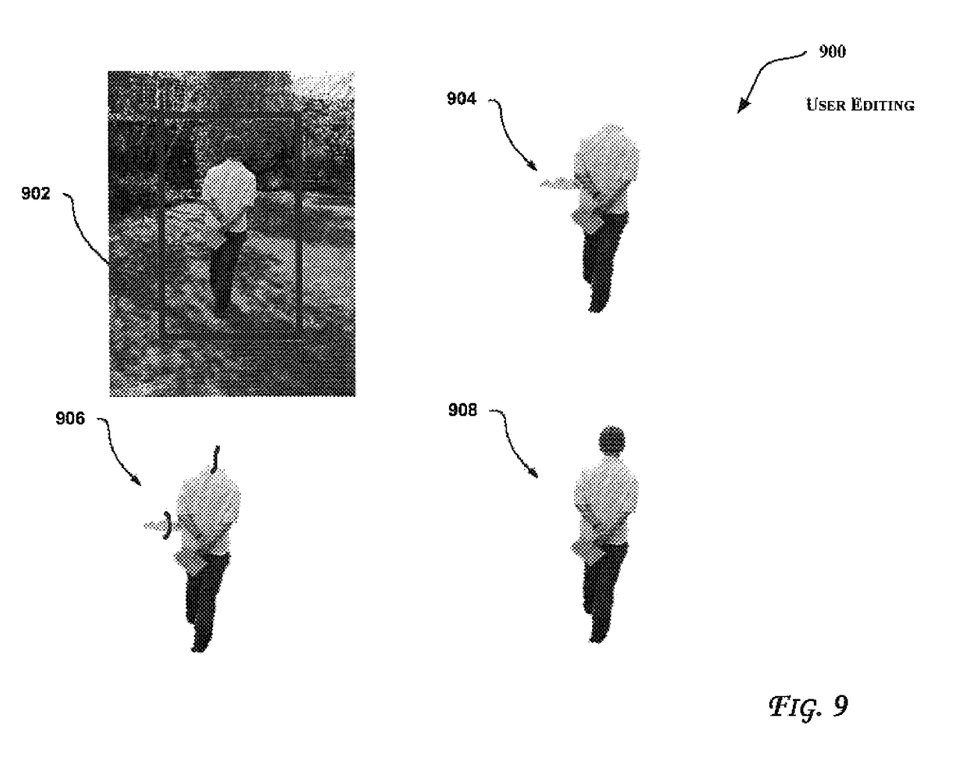
FIG. 9 illustrates an exemplary result of user editing.

An exemplary case is represented in FIG. 9. After the initial user interaction and segmentation (902 and 904, respectively), further user edits (906) provide a desired result (908). In one implementation, it is sufficient to brush, roughly, just part of a wrongly labeled area (906). After brushing, the estimation stage 706 may be applied to achieve the desired result, i.e., propagating the brushed labels (from 906) appropriately across the incorrectly labeled areas.

Hardware Implementation

Figure 10:
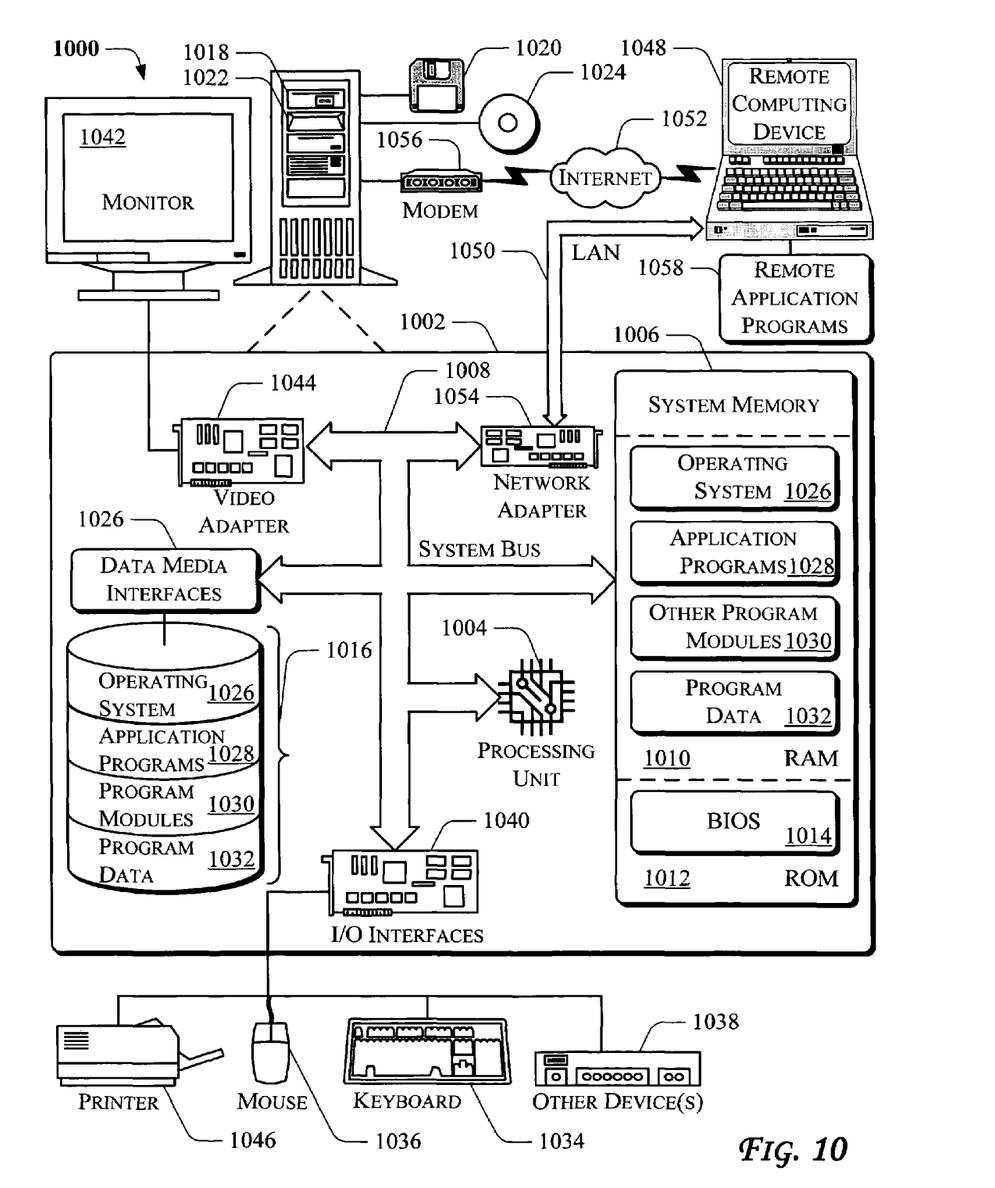
FIG. 10 illustrates a general computer environment, which can be used to implement the techniques described herein.

FIG. 10 illustrates a general computer environment 1000, which can be used to implement the techniques described herein. For example, the computer environment 1000 may be utilized to execute instructions associated with performing the tasks discussed with reference to the previous figures. The computer environment 1000 is only one example of a computing environment and is not intended to suggest any limitation as to the scope of use or functionality of the computer and network architectures. Neither should the computer environment 1000 be interpreted as having any dependency or requirement relating to any one or combination of components illustrated in the exemplary computer environment 1000.

Computer environment 1000 includes a general-purpose computing device in the form of a computer 1002. The components of computer 1002 can include, but are not limited to, one or more processors or processing units 1004 (optionally including a cryptographic processor or co-processor), a system memory 1006, and a system bus 1008 that couples various system components including the processor 1004 to the system memory 1006.

The system bus 1008 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 1002 typically includes a variety of computer-readable media. Such media can be any available media that is accessible by computer 1002 and includes both volatile and non-volatile media, removable and non-removable media.

The system memory 1006 includes computer-readable media in the form of volatile memory, such as random access memory (RAM) 1010, and/or non-volatile memory, such as read only memory (ROM) 1012. A basic input/output system (BIOS) 1014, containing the basic routines that help to transfer information between elements within computer 1002, such as during start-up, is stored in ROM 1012. RAM 1010 typically contains data and/or program modules that are immediately accessible to and/or presently operated on by the processing unit 1004.

Computer 1002 may also include other removable/non-removable, volatile/non-volatile computer storage media. By way of example, FIG. 10 illustrates a hard disk drive 1016 for reading from and writing to a non-removable, non-volatile magnetic media (not shown), a magnetic disk drive 1018 for reading from and writing to a removable, non-volatile magnetic disk 1020 (e.g., a "floppy disk"), and an optical disk drive 1022 for reading from and/or writing to a removable, non-volatile optical disk 1024 such as a CD-ROM, DVD-ROM, or other optical media. The hard disk drive 1016, magnetic disk drive 1018, and optical disk drive 1022 are each connected to the system bus 1008 by one or more data media interfaces 1026. Alternatively, the hard disk drive 1016, magnetic disk drive 1018, and optical disk drive 1022 can be connected to the system bus 1008 by one or more interfaces (not shown).

The disk drives and their associated computer-readable media provide non-volatile storage of computer-readable instructions, data structures, program modules, and other data for computer 1002. Although the example illustrates a hard disk 1016, a removable magnetic disk 1020, and a removable optical disk 1024, it is to be appreciated that other types of computer-readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 1016, magnetic disk 1020, optical disk 1024, ROM 1012, and/or RAM 1010, including by way of example, an operating system 1026, one or more application programs 1028, other program modules 1030, and program data 1032. Each of such operating system 1026, one or more application programs 1028, other program modules 1030, and program data 1032 (or some combination thereof) may implement all or part of the resident components that support the distributed file system.

A user can enter commands and information into computer 1002 via input devices such as a keyboard 1034 and a pointing device 1036 (e.g., a "mouse"). Other input devices 1038 (not shown specifically) may include a microphone, joystick, game pad, satellite dish, serial port, scanner, and/or the like. These and other input devices are connected to the processing unit 1004 via input/output interfaces 1040 that are coupled to the system bus 1008, but may be connected by other interface and bus structures, such as a parallel port, game port, or a universal serial bus (USB).

A monitor 1042 or other type of display device can also be connected to the system bus 1008 via an interface, such as a video adapter 1044.

In addition to the monitor 1042, other output peripheral devices can include components such as speakers (not shown) and a printer 1046 which can be connected to computer 1002 via the input/output interfaces 1040.

Computer 1002 can operate in a networked environment using logical connections to one or more remote computers, such as a remote computing device 1048. By way of example, the remote computing device 1048 can be a personal computer, portable computer, a server, a router, a network computer, a peer device or other common network node, game console, and the like. The remote computing device 1048 is illustrated as a portable computer that can include many or all of the elements and features described herein relative to computer 1002.

Logical connections between computer 1002 and the remote computer 1048 are depicted as a local area network (LAN) 1050 and a general wide area network (WAN) 1052. Such networking environments are commonplace in offices, enterprise-wide computer networks, intranets, and the Internet.

When implemented in a LAN networking environment, the computer 1002 is connected to a local network 1050 via a network interface or adapter 1054. When implemented in a WAN networking environment, the computer 1002 typically includes a modem 1056 or other means for establishing communications over the wide network 1052. The modem 1056, which can be internal or external to computer 1002, can be connected to the system bus 1008 via the input/output interfaces 1040 or other appropriate mechanisms. It is to be appreciated that the illustrated network connections are exemplary and that other means of establishing communication link(s) between the computers 1002 and 1048 can be employed.

In a networked environment, such as that illustrated with computing environment 1000, program modules depicted relative to the computer 1002, or portions thereof, may be stored in a remote memory storage device. By way of example, remote application programs 1058 reside on a memory device of remote computer 1048. For purposes of illustration, application programs and other executable program components such as the operating system are illustrated herein as discrete blocks, although it is recognized that such programs and components reside at various times in different storage components of the computing device 1002, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various implementations.

An implementation of these modules and techniques may be stored on or transmitted across some form of computer-readable media. Computer-readable media can be any available media that can be accessed by a computer. By way of example, and not limitation, computer-readable media may comprise "computer storage media" and "communications media."

"Computer storage media" includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically includes computer-readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared (IR), wireless fidelity (e.g., IEEE 802.11b wireless networking) (Wi-Fi), cellular, Bluetooth enabled, and other wireless media. Combinations of any of the above are also included within the scope of computer-readable media.

Conclusion

Although the invention has been described in language specific to structural features and/or methodological acts, it is to be understood that the invention defined in the appended claims is not necessarily limited to the specific features or acts described. Hence, the specific features and acts are disclosed as exemplary forms of implementing the claimed invention.

What is claimed is:

1. A method comprising:
    receiving a segmented image having a foreground region and a background region;
    determining a contour along a boundary between the foreground and background regions;
    defining an energy function corresponding to one or more parameters of an alpha map of pixels in an unknown region extending from the contour;
    estimating a center parameter and a width parameter for the alpha map by minimizing the defined energy function; and
    computing the alpha map corresponding to the estimated center and width parameters.

2. A method as recited by claim 1, wherein the image is segmented as a bimap.

3. A method as recited by claim 1, wherein the image is segmented as a trimap, wherein the unknown region is defined by the trimap.

4. A method as recited by claim 1, wherein the energy function has one or more terms selected from a group comprising a smoothing regularizer term and a data likelihood term.

5. A method as recited by claim 1, wherein the contour is determined by a curve-fitting technique applied to a boundary of the unknown region.

6. A method as recited by claim 1, wherein the contour is determined by fitting a poly-line to a boundary of the unknown region.

7. A method as recited by claim 1, wherein the segmented image is provided by hard segmentation.

8. A method as recited by claim 1, wherein the energy minimization is performed by dynamic programming.

9. A method as recited by claim 1, wherein the image segmentation is defined by a user.

10. A method as recited by claim 1, wherein for a bimap segmented image, the method further comprises determining an unknown region extending from the contour.

11. A method as recited by claim 1, further comprising estimating one or more foreground pixel colors to limit color bleeding in from the background region.

12. A method as recited by claim 1, further comprising estimating one or more foreground pixel colors to limit color bleeding in from the background region, wherein the estimating of the foreground pixel colors comprises:
applying Bayes matte to obtain an estimate of a foreground color of a first pixel; and
borrowing a pixel color from a second foreground pixel within a neighborhood of the first pixel that is most similar in color to the estimated foreground color of the first pixel.

13. A method comprising: receiving a bimap-segmented image having a foreground region and a background region; determining a contour along a boundary between the foreground and background regions; determining an unknown region extending from the contour; defining an energy function for pixels in the unknown region, the energy function having one or more terms selected from a group comprising a smoothing regularizer term and a data likelihood term; estimating a center and a width parameter for the alpha map by minimizing the defined energy function; and computing an alpha map corresponding to the estimated center and width parameters.

14. A method as recited by claim 13, wherein the contour is determined by a curve-fitting technique applied to a boundary of the unknown region.

15. A method as recited by claim 13, wherein the bimap is provided by hard segmentation.

16. A method as recited by claim 13, wherein the energy minimization is performed by dynamic programming.

17. A method as recited by claim 13, further comprising estimating one or more foreground pixel colors to limit color bleeding in from the background region.

18. A method as recited by claim 13, further comprising estimating one or more foreground pixel colors to limit color bleeding in from the background region, wherein the estimating of the foreground pixel colors comprises:
applying Bayes matte to obtain an estimate of a foreground color of a first pixel; and
borrowing a pixel color from a second foreground pixel within a neighborhood of the first pixel that is most similar in color to the estimated foreground color of the first pixel.

19. One or more computer-readable media having instructions stored thereon that, when executed, direct a machine to perform acts comprising:
receiving a segmented image having a foreground region and a background region;
determining a contour along a boundary between the foreground and background regions;
defining an energy function corresponding to one or more parameters of an alpha map of pixels in an unknown region extending from the contour;
estimating a center parameter and a width parameter for the alpha map by minimizing the defined energy function; and
computing the alpha map corresponding to the estimated center and width parameters.

20. One or more computer-readable media as recited by claim 19, wherein the image is segmented as a bimap.

21. One or more computer-readable media as recited by claim 19, wherein the image is segmented as a trimap, wherein the unknown region is defined by the trimap.

22. One or more computer-readable media as recited by claim 19, wherein the energy function has one or more terms selected from a group comprising a smoothing regularizer term and a data likelihood term.

23. One or more computer-readable media as recited by claim 19, wherein the contour is determined by a curve-fitting technique applied to a boundary of the unknown region.

24. One or more computer-readable media as recited by claim 19, wherein the segmented image is provided by hard segmentation.

25. One or more computer-readable media as recited by claim 19, wherein the energy minimization is performed by dynamic programming.

26. One or more computer-readable media as recited by claim 19, wherein the image segmentation is defined by a user.

27. One or more computer-readable media as recited by claim 19, wherein the acts further comprise estimating one or more foreground pixel colors to limit color bleeding in from the background region.

28. One or more computer-readable media as recited by claim 19, wherein the acts further comprise estimating one or more foreground pixel colors to limit color bleeding in from the background region, wherein the estimating of the foreground pixel colors comprises:
applying Bayes matte to obtain an estimate of a foreground color of a first pixel; and
borrowing a pixel color from a second foreground pixel within a neighborhood of the first pixel that is most similar in color to the estimated foreground color of the first pixel.

* * * * *